(12) United States Patent
Ellul

(10) Patent No.: US 10,800,917 B2
(45) Date of Patent: Oct. 13, 2020

(54) REACTIVE BLENDS OF NYLON AND ANHYDRIDE OLIGOMER

(71) Applicant: ExxonMobil Chemical Patents Inc., Baytown, TX (US)

(72) Inventor: Maria D. Ellul, Silver Lake Village, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/934,276

(22) Filed: Mar. 23, 2018

(65) Prior Publication Data

US 2018/0327590 A1 Nov. 15, 2018

Related U.S. Application Data

(60) Provisional application No. 62/503,526, filed on May 9, 2017.

(51) Int. Cl.
| | | |
|---|---|---|
| *C08L 77/00* | (2006.01) | |
| *C08L 23/26* | (2006.01) | |
| *C08F 8/46* | (2006.01) | |

(52) U.S. Cl.
CPC ............... *C08L 77/00* (2013.01); *C08F 8/46* (2013.01); *C08L 23/26* (2013.01); *C08L 2201/14* (2013.01); *C08L 2203/16* (2013.01)

(58) Field of Classification Search
CPC ..... C08F 8/46; C08L 2201/14; C08L 2203/16
See application file for complete search history.

(56) References Cited

U.S. PATENT DOCUMENTS

| | | | |
|---|---|---|---|
| 9,200,158 B2 | 12/2015 | Ellul et al. | |
| 2007/0154668 A1* | 7/2007 | Rhee | B32B 27/34 428/35.7 |
| 2008/0299057 A1* | 12/2008 | Lin | A61K 8/044 424/59 |
| 2013/0157049 A1* | 6/2013 | Shannon | B29C 48/92 428/343 |
| 2014/0309371 A1* | 10/2014 | Ellul | C08L 23/02 525/63 |

FOREIGN PATENT DOCUMENTS

| | | | |
|---|---|---|---|
| CN | 101284897 A | * | 10/2008 |
| WO | 1994-200223 | * | 6/1994 |

OTHER PUBLICATIONS

Rivera-Tirado et al. Journal of Applied Polymer Science, vol. 124, 2682-2690 (Year: 2012).*

De Groote, P. et al., "The effeei ef benzenesulfonamide plasticizers on the glass transition temperature of an amorphous aliphatic polyamide", Society of Chemical Industry, Polym. Int., vol. 51, pp. 40-49 (2001).

Marechal, P. et al., "Amin/Anhydride Reaction versus Amide/Anhydride Reaction in Polyamide/Anhydride Carriers", J. Appl. Polym. Sci., Polym. Chem., vol. 33, pp. 757-766 (1995).

* cited by examiner

*Primary Examiner* — Mark S Kaucher
(74) *Attorney, Agent, or Firm* — Derek M. Kato

(57) ABSTRACT

A composition having at least one thermoplastic resin and an anhydride functionalized oligomer grafted to the thermoplastic resin.

9 Claims, 2 Drawing Sheets

REACTIVE BLENDS OF NYLON AND ANHYDRIDE OLIGOMER

CROSS-REFERENCE TO RELATED APPLICATIONS

This application claims priority to U.S. Ser. No. 62/503,526, filed May 9, 2017, herein incorporated by reference.

FIELD OF THE INVENTION

The present invention relates to compositions comprising thermoplastic resins and anhydride-functionalized oligomers for gas-barrier applications such as films, hoses, and tire liners.

BACKGROUND OF THE INVENTION

The present invention is related to compositions particularly useful for gas-barrier applications that require impermeability characteristics.

Thermoplastic resins such as polyamide (nylon) or polycarbonate are well known in the industry for gas barrier properties. Combining these resins with high molecular weight reactive elastomers, such as maleated ethylene propylene diene rubber, to improve impact properties is also known. Thermoplastic resins can also be blended with low molecular weight compatible diluents or plasticizers, such as benzenebutylsulfonamide (BBSA) to reduce the viscosity of the resulting blend. At high processing temperatures of these thermoplastic resins, commonly used plasticizers described above are fugitive and therefore undesirable for environmental reasons.

Polyisobutylene (PIB) is a commonly used polymer in gas-barrier applications. The inventors have found that low molecular weight liquid oligomers of PIB containing chemically bound reactive anhydride moieties, such as succinic anhydride, known as anhydride functionalized oligomers (AFO) may be blended and reacted with polyamide thermoplastic resins to improve the processability of thermoplastic resins by reducing the viscosity. Unlike commonly used plasticizers, AFO is chemically bound to these thermoplastic resins and therefore is not fugitive. Accordingly, it has been discovered to use a composition with a chemically reacted blend of AFO known as polyisobutylene succinic anhydride (PIBSA) and polyamide thermoplastic resins for gas-barrier applications that overcomes the limitations of commonly used nylon plasticizers in the industry.

U.S. Pat. No. 9,200,158 is directed to a dynamically vulcanized alloy with at least one isobutylene-containing elastomer, at least one thermoplastic resin, and an anhydride functionalized oligomer grafted to the resin. The anhydride functionalized oligomer serves as a plasticizer to reduce the viscosity of the thermoplastic resin in the manufacture of the dynamically vulcanized alloy. Academic work in this field, such as P. Mareschal, et al., "Amine/Anhydride Reaction versus Anhydride Reaction in Polyamide/Anhydride Carriers," J. Appl. Polym. Sci., Polym. Chem. 33, 757-66 (1995) and P. De Groot, et al., "The Effect of Benzenesulfonamide Plasticizers on the Glass Transition Temperature of an Amorphous Aliphatic Polyamide," Polym. Int. 51, 40-9 (2001) were not directed to the issue of non-fugitive reactive oligomers for thermoplastic resins in place of non-reactive fugitive small molecule plasticizers, such as BBSA.

This invention is useful in various polyamide film and other gas-barrier applications requiring a processable high molecular weight thermoplastic resin without using traditional non-reactive plasticizers as viscosity modifiers.

SUMMARY OF THE INVENTION

This invention is directed to a gas barrier composition consisting essentially of at least one thermoplastic resin; and an anhydride functionalized oligomer.

BRIEF DESCRIPTION OF THE DRAWINGS

The invention will be described by way of example and with reference to the accompanying drawing in which.

DETAILED DESCRIPTION OF THE INVENTION

Figure 1:
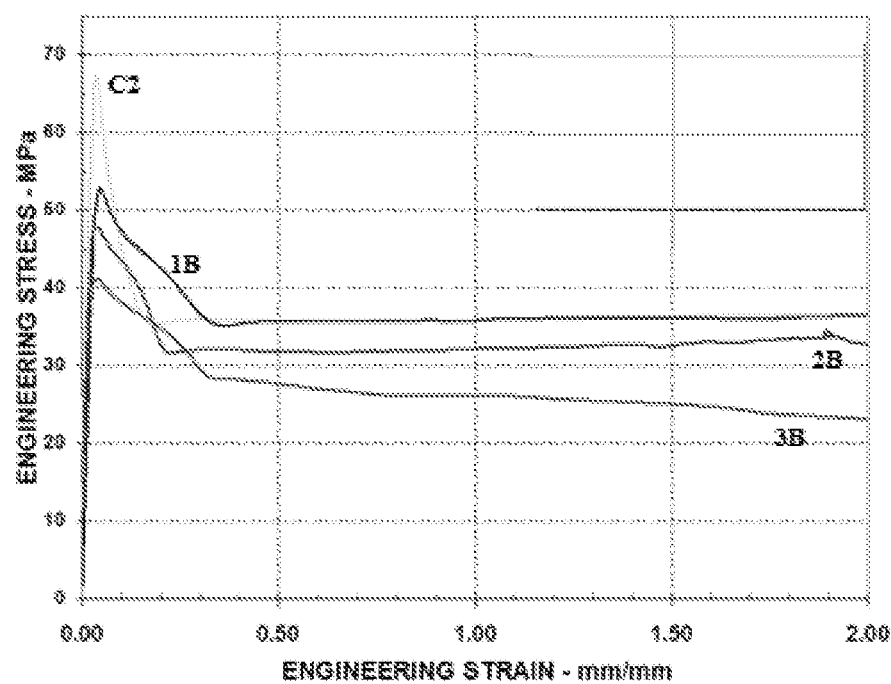
FIG. 1 depicts the effect of AFO on the tensile properties of the thermoplastic resin.

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Definitions

Definitions applicable to the presently described invention are as described below.

Polymer may be used to refer to homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the polymerized form of a derivative from the monomer (i.e., a monomeric unit). However, for ease of reference, the phrase comprising the (respective) monomer or the like is used as shorthand. Likewise, when catalyst components are described as comprising neutral stable forms of the components, it is well understood by one skilled in the art, that the ionic form of the component is the form that reacts with the monomers to produce polymers.

Thermoplastic Resin

For purposes of the present invention, a thermoplastic (alternatively referred to as thermoplastic resin) is a thermoplastic polymer, copolymer, or mixture thereof having a Young's modulus of more than 200 MPa at 23° C. The resin should have a melting temperature of about 170° C. to about 260° C., preferably less than 260° C., and most preferably less than about 240° C. By conventional definition, a thermoplastic is a synthetic resin that softens when heat is applied and regains its original properties upon cooling.

Such thermoplastic resins may be used singly or in combination and generally contain nitrogen, oxygen, halogen, sulfur or other groups capable of interacting with aromatic functional groups such as halogen or acidic groups. Suitable thermoplastic resins include resins selected from the group consisting or polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK), ethylene copolymer resins (EVA or EVOH) and mixtures thereof.

Suitable polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are poly-caprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Commercially available polyamides may be advantageously used in the practice of this invention, with linear crystalline polyamides having a softening point or melting point between 160 and 260° C. being preferred.

Suitable polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly (trans-1,4-cyclohexylene adipate); poly (cis or trans-1,4-cyclohexanedimethylene) alkanedicarboxylates such as poly(cis-1,4-cyclohexanedimethylene) oxlate and poly-(cis-1,4-cyclohexanedimethylene) succinate, poly ($C_{2-4}$ alkylene terephthalates) such as polyethylene-terephthalate and polytetramethylene-terephthalate, poly ($C_{2-4}$ alkylene isophthalates) such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) resins which may be used in accordance with this invention are well known, commercially available materials produced by the oxidative coupling polymerization of alkyl substituted phenols. They are generally linear, amorphous polymers having a glass transition temperature in the range of 190° C. to 235° C.

Ethylene copolymer resins useful in the invention include copolymers of ethylene with unsaturated esters of lower carboxylic acids as well as the carboxylic acids per se. In particular, copolymers of ethylene with vinylacetate or alkyl acrylates for example methyl acrylate and ethyl acrylate can be employed. These ethylene copolymers typically comprise about 60 to about 99 wt % ethylene, preferably about 70 to 95 wt % ethylene, more preferably about 75 to about 90 wt % ethylene. The expression "ethylene copolymer resin" as used herein means, generally, copolymers of ethylene with unsaturated esters of lower ($C_1$-$C_4$) monocarboxylic acids and the acids themselves; e.g., acrylic acid, vinyl esters or alkyl acrylates. It is also meant to include both "EVA" and "EVOH", which refer to ethylene-vinylacetate copolymers, and their hydrolyzed counterpart ethylene-vinyl alcohols.

Compounds commonly referred to as plasticizers have also typically been employed as compatibilizers. As already discussed, it has been conventional in the art to use a sulfonamide, such as BBSA, as the plasticizer for nylon in tire and other applications. The presence of the sulfonamide has, until the present invention, been felt to be a necessary component in the composition despite any negative 'blooming' onto the final product that might occur.

Both maleic and succinic anhydride functionalized oligomers are useful in the present invention. The anhydride functionalized oligomer may be prepared by thermal or chloro methods known in the art of reacting an alkyl, aryl, or olefin oligomer with anhydride, preferably maleic anhydride. The oligomer of any embodiment of the invention, including copolymers of lower olefins, being reacted with the anhydride, has a number average molecular weight in the ranges of about 500 to 5000, 500 to 2500, 750 to 2500, or 500 to 1500. The oligomer of the invention may also have a number average molecular weight in the ranges of 1000 to 5000, 800 to 2500, or 750 to 1250. Specific examples of succinic anhydrides include poly-isobutylene succinic anhydride, poly-butene succinic anhydride, n-octenyl succinic anhydride, n-hexenyl succinic anhydride, and dodecenyl succinic anhydride.

The number average molecular weight of the anhydride functionalized oligomer can be measured according to the test method provided in E. Rivera-Tirado, D. J. Aaserud, and C. Wesdemiotis. *Characterization of Polyisobutylene Succinic Anhydride Chemistries Using Mass Spectrometry*, DOI 10.1002/app.35263 (Nov. 2, 2011), available at wileyonlinelibrary.com, incorporated herein by reference in its entirety.

The most preferred anhydride functionalized oligomers for this invention are those derived from polybutene or polyisobutene. Those derived from polyisobutene are commonly known as polyisobutylene succinic anhydride or polyisobutene succinic anhydride (PIBSA). The PIBSA may be made by cationic polymerization of isobutene with boron trifluoride as catalyst. In the course of the polymerization, high concentrations of α-olefins are formed during the transfer reaction and as a result the polymerization product has a high proportion of terminal double bonds (α-olefin). They are normally clear to amber viscous liquids and are specially optimized during the post polymerization maleion reaction to have a low bismaleation.

The anhydride level of the AFO of the invention may vary and a preferred range is a few percent up to about 30 wt % with a preferred range of 5 to 25 wt % and a more preferred range of 7 to 17 wt % and a most preferred range of 9 to 15 wt %.

EXAMPLES

Novamid® 2010R is a polyamide –6/66 copolymer commercially available from DSM Engineering Plastics having a number average molecular weight of 8,100 g/mol and 85 wt % of PA 6 and 15 wt % of PA66. PIBSA 950 is a polyisobutylene succinic anhydride commercially available from Texas Petrochemicals LP or as Dovermulse H1000 from Dover Chemical Corp. PIBSA 950 has a number average molecular weight of 950 g/mol before anhydride reaction, viscosity at 100° C. of 459 cSt and a saponification number of 100 mg KOH/gm. UBE5024 is a Nylon –6/66 polyamide copolymer of number average molecular weight, $M_n$, 24,000 and is commercially available from UBE Chemicals, having 80 wt % PA 6 and 20 wt % PA66, it has a higher viscosity/molecular weight as compared to Novamid 2010. Chemically reacted blends of compositions described in Tables I and II were made at temperatures above the melt on a twin screw extruder with very good venting to remove the water byproduct of the reaction between nylon and PIBSA.

Stress/strain properties (tensile strength, elongation at break, elongation at yield,) were measured at room temperature using an Instron™ 4204. Test method was based on ASTM D638. Tensile measurements were done at ambient temperature, about 20° C. to about 23.5° C., on specimens having a dog-bone shape with a width of 0.16 inches (0.41 cm) and a length of 0.75 inches (1.91 cm). The thickness of the specimens varied and was measured manually by a Mahr Federal Inc. thickness gauge. The specimens were pulled at a crosshead speed of 20 inches/min. (51 cm/min.) and the stress/strain data was recorded. The average stress/strain value of at least three specimens is reported. LCR viscosity was measured with a Dynisco™ capillary rheometer at 30/1 L/D (length/diameter) at 220° C. at 300 l/s. The thermal gravimetric analysis (TGA) measures changes in weight loss (reported in %) at 265° C. under $N_2$, and is used to measure the loss of volatiles, such as the AFO. The TGA weight loss measurement was measured using a Universal V4.7A TA instrument. The formulation was heated to 265° C. at a rate of 20° C./min. The temperature was kept constant at 265° C. for 120 minutes, and cooling the material to 30° C. at a rate of 50° C./min. The melting point, $T_m$, glass transition temperature, $T_g$, crystallization temperature, $T_c$, heat of fusion, $H_f$ and heat of crystallization, $H_c$ was measured by differential scanning calorimetry at 10° C./minute heating and cooling rate, according to ASTM D3418-03. The "melting point" is defined as the temperature of the greatest heat absorption within the range of melting of the sample. However, the material may show secondary melting peaks adjacent to the principal peak, and/or at the end-of-melt transition. For the purposes of this disclosure, such secondary melting peaks are considered together as a single melting point, with the highest of these peaks being considered the melting point. Table 1 reports both first and secondary peaks.

TABLE 1

AFO AND THERMOPLASTIC RESIN BINARY BLENDS

| Formulation No. | Formulations (wt %) | LCR Viscosity (Pa · s) at 300 (1/s) at 200° C. (L/D 30/1) | $T_g$ (° C.) | $T_m$ (° C.) | $H_f$ (° C.) | $T_c$ (° C.) | $H_c$ (J/g) | 2 h TGA wt loss at 265° C. under $N_2$ (%) |
|---|---|---|---|---|---|---|---|---|
| C1 | 100% Novamid 2010R | 187 | 49.9; 37.0 | 202.2; 198.4 | 90.9; 48.1 | 132.0; 132.1 | 47.9; 49.5 | 2.4 |
| 1A | 95% Novamid 2010R/ 5% PIBSA 950 | 158 | 42.5; 32.4 | 199.3; 198.0 | 48.9; 47.9 | 165.8; 166.0 | 58.9; 61.2 | 2.1 |
| 2A | 90% Novamid 2010R/ 10% PIBSA 950 | 143 | 43.9; 30.7 | 199.1; 198.0 | 46.3; 50.1 | 166.0; 166.2 | 50.7; 51.7 | 2.6 |
| 3A | 87% Novamid 2010R/ 13% PIBSA 950 | 81 | 43.1; 34.6 | 198.9; 198.3 | 48.1; 50.6 | 165.7; 165.7 | 51.6; 52.0 | 3.6 |
| 4A | 84% Novamid 2010R/ 16% PIBSA 950 | 50 | 43.8; 38.5 | 199.5; 198.3 | 44.6; 44.4 | 166.2; 166.2 | 51.1; 54.7 | 4.2 |

| Formulation No. | Formulations (wt %) | Maximum Load (lb) | Tensile Strength at Max Load (MPa) | Tensile Strength at Yield (MPa) | Tensile Strength at Break (MPa) | Elongation at Yield (%) | Elongation at Break (%) |
|---|---|---|---|---|---|---|---|
| C1 | 100% Novamid 2010R | 324 | 68.7 | 68.7 | 18.5 | 4.2 | 252 |
| 1A | 95% Novamid 2010R/ 5% PIBSA 950 | 298 | 63.3 | 63.3 | 18.0 | 4.4 | 133 |

TABLE 1-continued

AFO AND THERMOPLASTIC RESIN BINARY BLENDS

| 2A | 90% Novamid 2010R/ 10% PIBSA 950 | 269 | 57.3 | 57.3 | 19.0 | 4.1 | 170 |
|---|---|---|---|---|---|---|---|
| 3A | 87% Novamid 2010R/ 13% PIBSA 950 | 250 | 53.0 | 52.9 | 26.4 | 4.1 | 282 |
| 4A | 84% Novamid 2010R/ 16% PIBSA 950 | 226 | 50.0 | 48.0 | 6.3 | 4.3 | 126 |

TABLE 2

ADDITIONAL AFO AND THERMOPLASTIC RESINS BINARY BLENDS

| No. | Formulations (wt %) | Maximum Load (lb) | Tensile Strength at Max Load (MPa) | Tensile Strength at Yield (MPa) | Tensile Strength at Break (MPa) | Elongation at Yield (%) | Elongation at Break (%) |
|---|---|---|---|---|---|---|---|
| C2 | 100% UBE5024 | 312 | 65.8 | 65.8 | 44.3 | 4.0 | 423 |
| 1B | 95% UBE5024/ 5% PIBSA 950 | 259 | 54.3 | 53.6 | 42.6 | 3.9 | 367 |
| 2B | 90.3% UBE5024/ 9.7% PIBSA 950 | 235 | 49.5 | 48.6 | 24.5 | 3.6 | 378 |
| 3B | 87.5% UBE5024/ 12.5% PIBSA 950 | 188 | 40.0 | 40.0 | 11.5 | 3.9 | 349 |

Table 1 shows one comparative formulation (C1) having 100% of a thermoplastic resin and four inventive formulations (1A-4A) having a binary blend of 95-84 wt % of thermoplastic resin (Novamid 2010R) and 5-16 wt % of an anhydride functionalized oligomer (PIBSA 950). Table 1 reports the viscosity, glass transition temperature, melting point, heat of fusion, crystallization temperature, and heat of crystallization of the formulations, as well as the weight loss over 2 hrs by TGA. Comparative formulation C1 showed significantly higher viscosity as compared to inventive formulations 1A-4A, which exhibited lower viscosities but without compromising the thermogravimetric weight loss. Table 1 also shows that tensile properties of the inventive formulations 1A-4A are similar to that of the comparative formulation C1.

Table 2 shows one comparative formulation (C2) having 100% of a thermoplastic resin and three inventive formulations (1B-3B) having a binary blend of 95-87.5 wt % of a thermoplastic resin (UBE5024) and 5-12.5 wt % of an anhydride functionalized oligomer (PIBSA 950). Tensile properties of the inventive formulations 1B-3B are similar to that of the comparative formulation C2.

Figure 2:
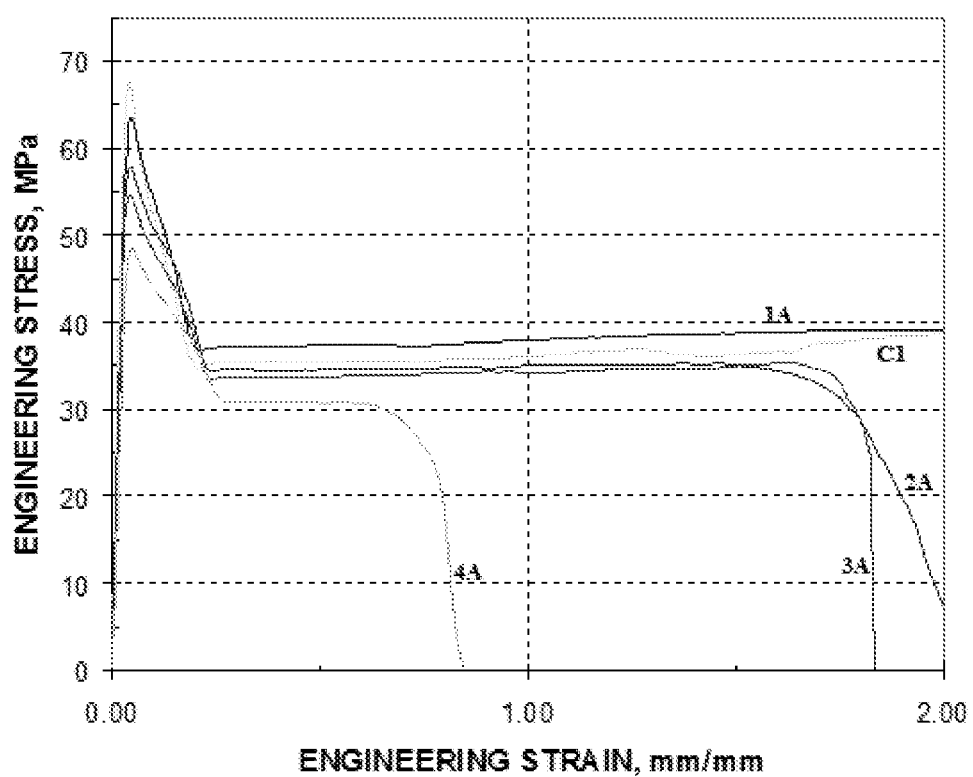
FIG. 2 depicts the effect of AFO on the tensile properties of another type of thermoplastic resin.

FIG. 1 and FIG. 2 show the effect of the AFO on the tensile properties of the thermoplastic resin. For both types of thermoplastic resin (UBE5024 for FIG. 1 and Novamid 2010 for FIG. 2), formulations with AFO were less stiff (had a lower peak stress) while maintaining extensibility and malleability—useful for processing operations including film blowing and sheet casting. Specifically, the peak stress decreased (i.e., formulations were less stiff) as the amount of AFO increased in the binary blend.

The inventive compositions can be used to make any number of articles. In one embodiment, the article is a hose or a hose component in multilayer hoses, such as those that contain polyamide as one of the component layers. Other useful goods that can be made using compositions of the invention include high gas barrier packaging, air spring bladders, seals, molded goods, cable housing, and other articles disclosed in THE VANDERBILT RUBBER HANDBOOK, 637-772, (Ohm, ed., R.T. Vanderbilt Company, Inc. 1990).

What is claimed is:

1. A gas barrier composition consisting of:
   a) at least one thermoplastic resin; and
   b) an anhydride functionalized oligomer in the amount of about 5 to about 20 wt% based on the total weight of the composition, wherein the oligomer has a number average molecular weight in the range of 500 to 2500, wherein the anhydride functionality is a succinic anhydride, and the anhydride functionalized oligomer is grafted to at least one thermoplastic resin.

2. The composition of claim 1, wherein the oligomer is selected from the group consisting of an alkyl, an aryl, and an alkenyl oligomer.

3. The composition of claim 1, wherein the anhydride functionalized oligomer is a poly-n-alkyl succinic anhydride or a poly-iso-alkyl succcinic anhydride.

4. The composition of claim 1, wherein the functionalized oligomer is selected from the group consisting of polyisobutylene succinic anhydride, polyisobutene succinic anhydride, polybutene succinic anhydride, polyisopentene succinic anhydride, polypentene succinic anhydride, polyoctenyl succinic anhydride, polyisooctenyl succinic anhydride, poly-hexenyl succinic anhydride, and poly-dodecenyl succinic anhydride.

5. The composition of claim 1, wherein the thermoplastic resin is selected from the group consisting of polyamides, polyimides, polycarbonates, polyesters, polysulfones, polylactones, polyacetals, acrylonitrile-butadiene-styrene resins, polyphenyleneoxide, polyphenylene sulfide, polystyrene, styrene-acrylonitrile resins, styrene maleic anhydride resins, aromatic polyketones, ethylene vinyl acetates, ethylene vinyl alcohols, and mixtures thereof.

6. The composition of claim 1, wherein the thermoplastic resin is derived from at least one amine.

7. The composition of claim 1, wherein the peak stress of the composition is lower than the peak stress of a composition consisting essentially of the at least one thermoplastic resin, wherein the peak stress is measured in accordance with ASTM D638, at ambient temperature, about 20° C. to about 23.5° C., on specimens having a dog-bone shape with a width of 0.16 inches and a length of 0.75 inches.

8. An article comprising the composition of claim 1, wherein the article is a hose, hose component, innerliner, and film.

9. The gas barrier composition of claim 1, wherein the at least one thermoplastic resin is a polyamide and wherein the anhydride functionalized oligomer is a poly-isobutylene succinic anhydride.

\* \* \* \* \*